US008535744B1

(12) United States Patent
Taghaddos

(10) Patent No.: US 8,535,744 B1
(45) Date of Patent: Sep. 17, 2013

(54) DEVICE FOR MAKING FRUIT JUICE AND METHOD OF PRODUCING INDIVIDUAL SERVINGS THEREOF

(76) Inventor: Hamid Taghaddos, Dubai (AE)

( * ) Notice: Subject to any disclaimer, the term of this patent is extended or adjusted under 35 U.S.C. 154(b) by 30 days.

(21) Appl. No.: 13/385,258

(22) Filed: Feb. 10, 2012

Related U.S. Application Data

(60) Provisional application No. 61/462,959, filed on Feb. 11, 2011.

(51) Int. Cl.
*A23B 4/06* (2006.01)

(52) U.S. Cl.
USPC ............ 426/393; 426/394; 426/392; 426/85; 426/115; 426/524; 100/211; 100/212; 100/213; 383/38; 383/906; 426/599; 426/489

(58) Field of Classification Search
USPC ................... 426/85, 392–394, 524, 112, 115, 426/489, 599; 100/211–213; 222/92, 94, 222/107; 206/219–222; 383/38, 906
See application file for complete search history.

(56) References Cited

U.S. PATENT DOCUMENTS

| | | | | | |
|---|---|---|---|---|---|
| 1,858,435 | A | * | 5/1932 | Conlon | 100/211 |
| 2,688,914 | A | * | 9/1954 | Eckler | 100/211 |
| 3,159,096 | A | * | 12/1964 | Tocker | 100/211 |
| 3,669,013 | A | * | 6/1972 | Stein | 100/211 |
| 4,715,963 | A | * | 12/1987 | Jones | 210/781 |
| 4,828,866 | A | * | 5/1989 | Wade et al. | 426/599 |
| 5,380,093 | A | * | 1/1995 | Goldman | 383/38 |
| 5,785,428 | A | * | 7/1998 | Mazzocchi | 383/103 |
| 2004/0118710 | A1 | * | 6/2004 | Bourque et al. | 206/219 |

FOREIGN PATENT DOCUMENTS

| JP | 10117925 A | * | 5/1998 |
|---|---|---|---|
| JP | 2006304748 A | * | 11/2006 |

\* cited by examiner

*Primary Examiner* — Drew Becker
*Assistant Examiner* — Luana Z Long
(74) *Attorney, Agent, or Firm* — William Nitkin

(57) ABSTRACT

A device and method for creating fruit juice utilizing a flexible bag having an upper fruit receiving portion for receiving a piece of fruit therein and a lower juice receiving portion, such portions separated by a mesh screen. There is a resealable closure member at the top of the fruit receiving portion. The flexible bag with fruit therein is then frozen and later thawed. The fruit receiving portion with fruit therein is squeezed to release juice from the fruit which passes through the mesh screen into the juice receiving portion which is accessible through a channel defined in the fruit receiving portion and mesh screen through which a straw can be passed into the juice receiving portion for drinking the juice.

1 Claim, 2 Drawing Sheets

DEVICE FOR MAKING FRUIT JUICE AND METHOD OF PRODUCING INDIVIDUAL SERVINGS THEREOF

This application claims priority and benefit of a provisional patent application entitled Device for Making Fruit Juice and Method of Producing Individual Servings Thereof, Application No. 61/462,959 filed Feb. 11, 2011.

BACKGROUND OF THE INVENTION

1. Field of the Invention

The device and method of this invention reside in the field of fruit juice production and more particularly relates to means for producing freshly squeezed fruit juice.

2. History of the Prior Art

One hundred percent fruit juice is associated with a nutritious diet, and the consumption of such juice is beneficial to a healthy diet. The consumption of such fruit juice is preferable to the consumption of sugar-added drinks especially for preventing obesity in children.

There are presently many manufacturing techniques for producing fruit juices which usually include the inspection of the raw fruit, washing of the fruit, and a squeezing process such as used for making orange juice which in some cases is then concentrated by removing water which is later added back before drinking by the consumer. In some cases juices are pasteurized where they are heated at a moderate temperature for a definite period of time in order to destroy undesirable bacteria without changing the fruit's chemical composition.

One hundred percent fruit juice has been found to be nutrient-dense, that is, rich in vitamins and minerals, such as potassium, vitamin C and folate. Presently many fruits are packaged in plastic bags and frozen before sale to the public. The purchaser then opens such bag, removes the portion desired to be used and defrosts that portion. If, for example, a bag of frozen strawberries were purchased, the user would defrost the portion desired and place the defrosted strawberries on cereal or place the defrosted strawberries in a blender to prepare a beverage with other ingredients. The fruit in such bags of frozen fruit is sold either whole or cut up into pieces or chunks. It is difficult for the average consumer to process whole fruit into a drinkable beverage without access to special equipment, such as a juicer or blender.

SUMMARY OF THE INVENTION

It is an object of this invention to provide a device and method for creating individual servings of freshly squeezed fruit juice in a manner usable by both children and adults without the need for specialized bulky or electrically powered equipment. The device of this invention consists of a resealable plastic bag having two portions: an upper fruit receipt portion and a lower juice receipt portion, such portions separated by a mesh filter screen. A piece of fresh fruit, such as an apple, is first washed and placed in the upper fruit receipt portion of the bag and the resealable closure is sealed. The bag is then placed in the freezer unit of a refrigerator. Freezing causes the fruit to undergo chemical changes. Water makes up over 90 percent of the weight of most fruits. The water along with other chemical substances is held within the fairly rigid cell walls of the fruit which gives support structure and texture to the fruit. Freezing the fruit causes the water contained in the fruit's cell structure to freeze. As the water freezes, it expands and forms ice crystals which cause the cell walls to rupture. Consequently the texture of the fruit, after thawing, is much softer than it was prior to freezing. Thus the fruit can become mushy and watery. This result is the reason why fruits that are frozen are usually completely thawed before consumption as the freezing effect on the fruit tissue is less noticeable.

In the method of this invention, a piece of fruit is placed within the upper portion of the resealable, flexible, plastic bag; and the bag is sealed and placed in a freezer, for example, the night before it is desired to be used to prepare freshly squeezed fruit juice. It is then removed from the freezer and allowed to defrost outside the refrigerator. The slow defrosting of the fruit keeps the fruit sufficiently cooled to maintain its freshness for consumption later in the day. It is envisioned that the device and method of this invention can be used by an adult or child desiring freshly squeezed fruit juice for lunch while away from home. When it is desired to create the juice, the child, for example, manually squeezes the upper fruit receipt portion of the bag and the fruit therein. Because the fruit has been frozen, it is easily manually crushed, releasing the fruit juice therein which passes through a mesh filter screen to the juice receipt portion in the lower portion of the bag from which it can be consumed through a straw inserted through a channel that passes into the juice receipt portion of the bag. It should be noted that most types of fruit can be utilized; and the pulp and seeds of the fruit remain in the upper compartment of the bag. After drinking the juice, the user can either dispose of the bag or take it home for thorough cleaning and reuse.

DESCRIPTION OF THE PREFERRED EMBODIMENT(S)

Figure 1:
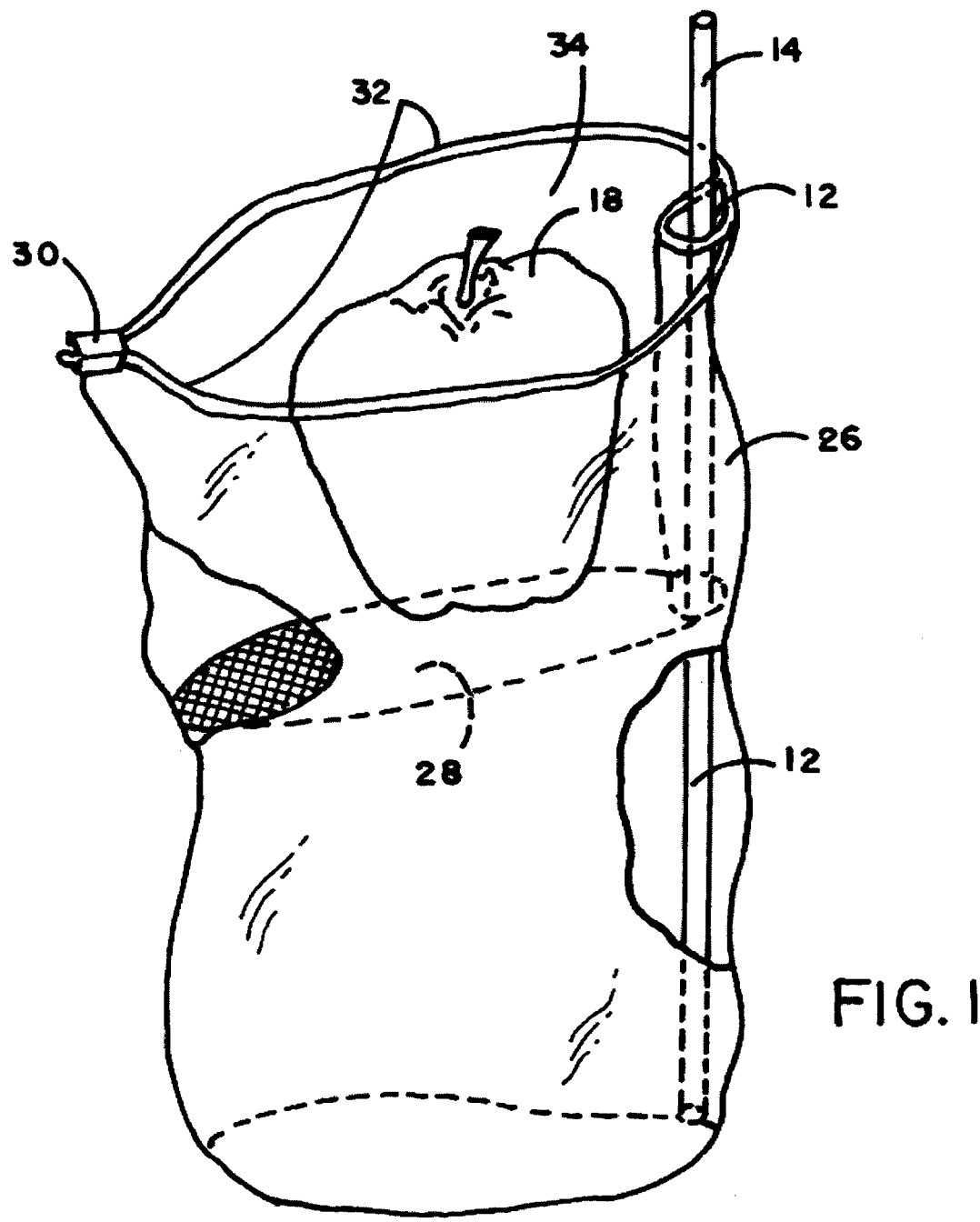
FIG. 1 illustrates a perspective view of the device of this invention showing a piece of fresh fruit disposed within the open upper fruit receipt portion of the flexible plastic resealable bag.
Figure 2:
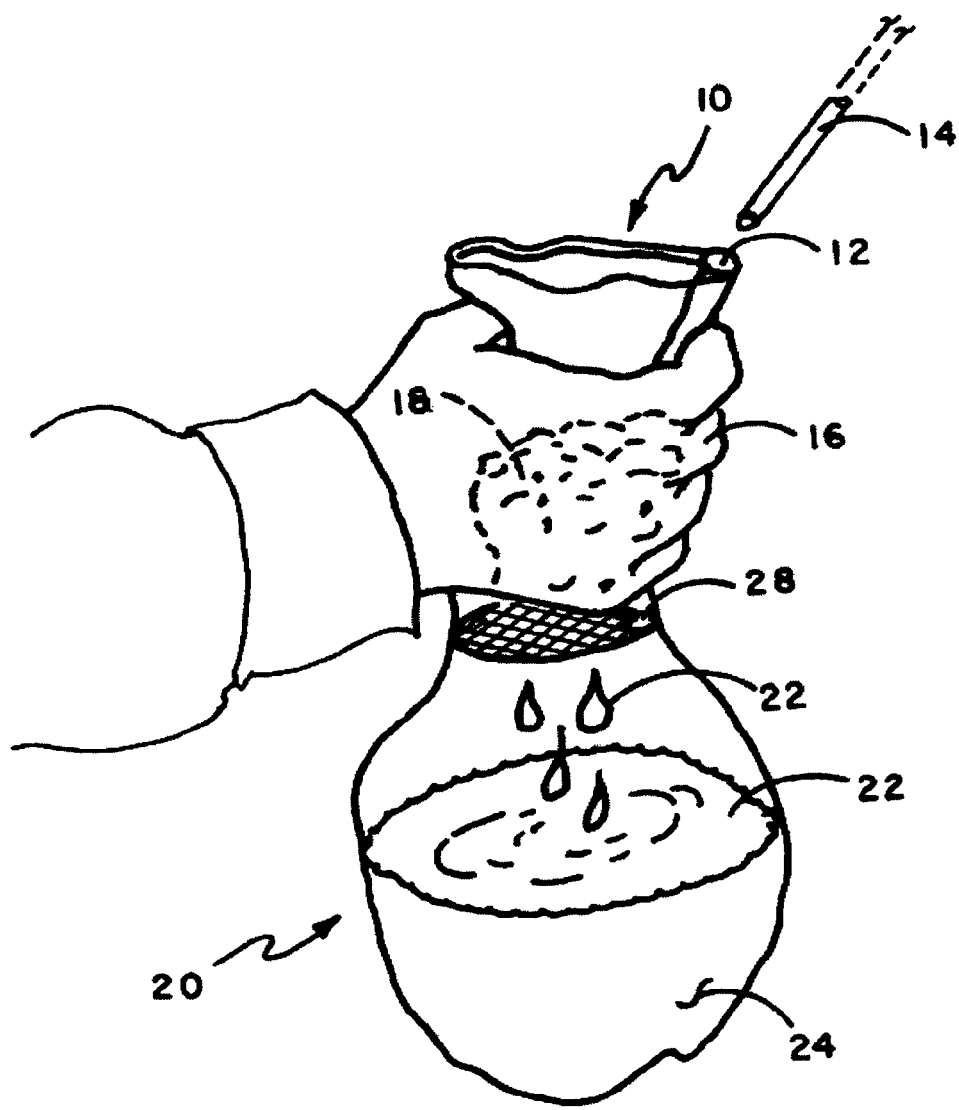
FIG. 2 illustrates the device of this invention showing the upper fruit-containing portion of the bag sealed and in the process of being manually squeezed, causing fruit juice to pass through the mesh filter screen and fall into the lower juice receipt portion of the bag.

FIG. 1 illustrates a perspective view of the device of this invention showing a piece of fresh fruit 18 placed within the open upper fruit receipt portion 34 of flexible plastic resealable bag 10. The fruit rests upon mesh filter screen 28 above juice receipt portion 24 in the lower portion of bag 10. A channel 12 extends through fruit receipt portion 26 to juice receipt portion 24 through which channel 12 a straw 14 can be inserted into juice receipt portion 24.

To practice the method of this invention piece of fruit 18 can be previously frozen prior to placing in fruit receipt portion 26 or it can be placed into fruit receipt portion 26 and then frozen in bag 10. In either case, several hours before its intended use, the previously frozen fruit can be removed from the freezer. After making sure the previously frozen fruit is tightly sealed by means of resealable closure 30, the bag can be taken to another second location for use, such as by a child for consumption during his lunch. When the user is ready to begin the process of making the juice, the user manually squeezes the now-defrosted piece of fruit 18 in fruit receipt portion 26 of bag 10, causing juice 22 to be released from defrosted fruit 18. Juice 22 passes through mesh filter screen 28 and falls into lower juice receipt portion 24 of bag 10 which collects the juice therein. One then inserts straw 14 into channel 12 into juice 22 held within juice receipt portion 24 of bag 10. One can then drink the juice through straw 14. After drinking the juice, the user can either dispose of the bag containing the remaining fruit pulp and any seeds or take it home for thorough cleaning and reuse.

It should be noted that a single piece of fruit or frozen piece of fruit can be placed in the bag of this invention or a combination of fruits can be used.

Although the present invention has been described with reference to particular embodiments, it will be apparent to those skilled in the art that variations and modifications can be substituted therefor without departing from the principles and spirit of the invention.

I claim:

1. A method of creating fruit juice comprising the steps of:
   providing a flexible bag having a fruit receiving portion and a juice receiving portion, said juice receiving portion positioned below said fruit receiving portion, said flexible bag having a top and a bottom;
   providing a mesh screen disposed in said flexible bag separating said fruit receiving portion from said juice receiving portion;
   providing a channel defined in said flexible bag, said channel extending from said fruit receiving portion to said juice receiving portion through said mesh screen, said channel of sufficient size to receive a straw; and
   providing a resealable closure member disposed at said top of said flexible bag,
   placing a piece of fruit into said fruit receiving portion of said flexible bag;
   closing said resealable closure member;
   freezing said piece of fruit in said fruit receiving portion of said flexible bag;
   thawing said piece of fruit in said fruit receiving portion of said flexible bag;
   squeezing fruit receiving portion of said flexible bag and said piece of fruit therein;
   releasing fruit juice from said piece of fruit by said squeezing step;
   passing said fruit juice through said mesh screen into said juice receiving portion of said flexible bag;
   collecting said fruit juice in said juice receiving portion; and
   passing a straw through said channel into said juice receiving portion for drinking said juice.

* * * * *